United States Patent [19]
Villedieu et al.

[11] Patent Number: 5,331,898
[45] Date of Patent: Jul. 26, 1994

[54] VEHICLE FOR THE AUTOMATIC LAYING OF A TRACK BY A VEHICLE TRAVELLING ON SAID TRACK AND TRACK DESIGNED FOR INSTALLATION BY SUCH A VEHICLE

[75] Inventors: Eric Villedieu, Saint Michel-sur-Orge; Daniel Francois, Vendome, both of France

[73] Assignee: Commissariat a l'Energie Atomique, France

[21] Appl. No.: 979,827

[22] Filed: Nov. 20, 1992

[30] Foreign Application Priority Data

Nov. 29, 1991 [FR] France .................. 91 14829

[51] Int. Cl.⁵ .......................................... E01B 29/00
[52] U.S. Cl. ........................................ 104/2; 104/7.1; 104/5
[58] Field of Search ............... 104/2, 3, 5, 7.1, 15

[56] References Cited

U.S. PATENT DOCUMENTS

| | | | |
|---|---|---|---|
| 1,941,930 | 1/1934 | Collet et al. | 104/2 |
| 4,000,699 | 1/1977 | Scheuchzer et al. | 104/2 |
| 4,571,825 | 2/1986 | Skibsted | 104/2 |
| 5,181,472 | 1/1993 | Scheuchzer | 104/2 |
| 5,195,436 | 3/1993 | Valditerra | 104/2 |

FOREIGN PATENT DOCUMENTS

| | | | |
|---|---|---|---|
| 1405022 | 5/1965 | France | 104/2 |
| 2588382 | 4/1987 | France . | |
| 2081766 | 3/1990 | Japan . | |
| 0844303 | 10/1960 | United Kingdom | 104/2 |
| 2080375 | 2/1982 | United Kingdom | 104/2 |

Primary Examiner—Mark T. Le
Attorney, Agent, or Firm—Pearne, Gordon, McCoy & Granger

[57] ABSTRACT

Vehicle able to lay a specially designed track formed from elements (5, 6, 7) joined end to end. The vehicle advances along the track and carries a track element (8) on the carriage. When it reaches the end of the track, the carriage is lowered so that the element can be fitted into the preceding element. The elements are of different types so as to permit track height and direction changes.

14 Claims, 15 Drawing Sheets

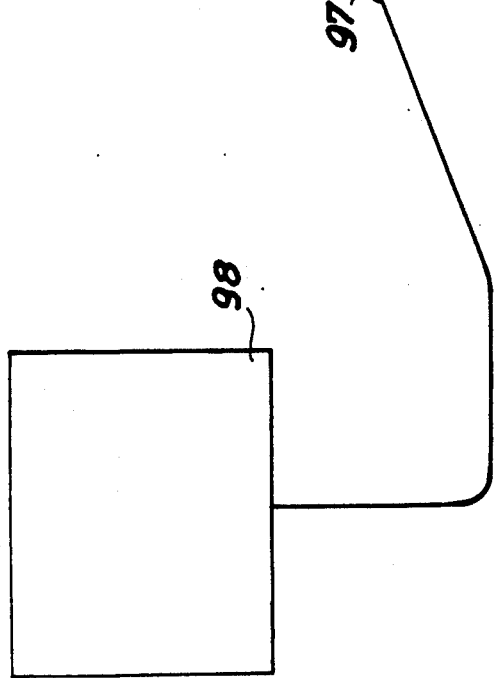
FIG.1
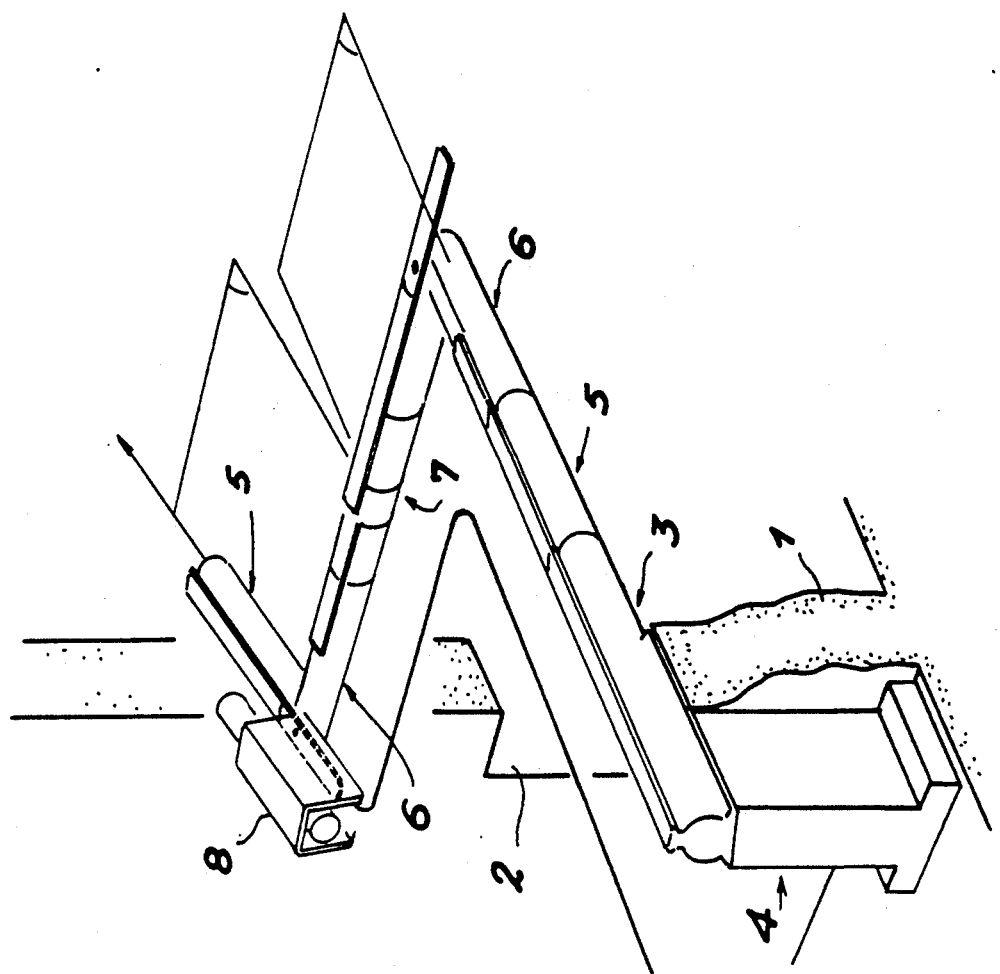

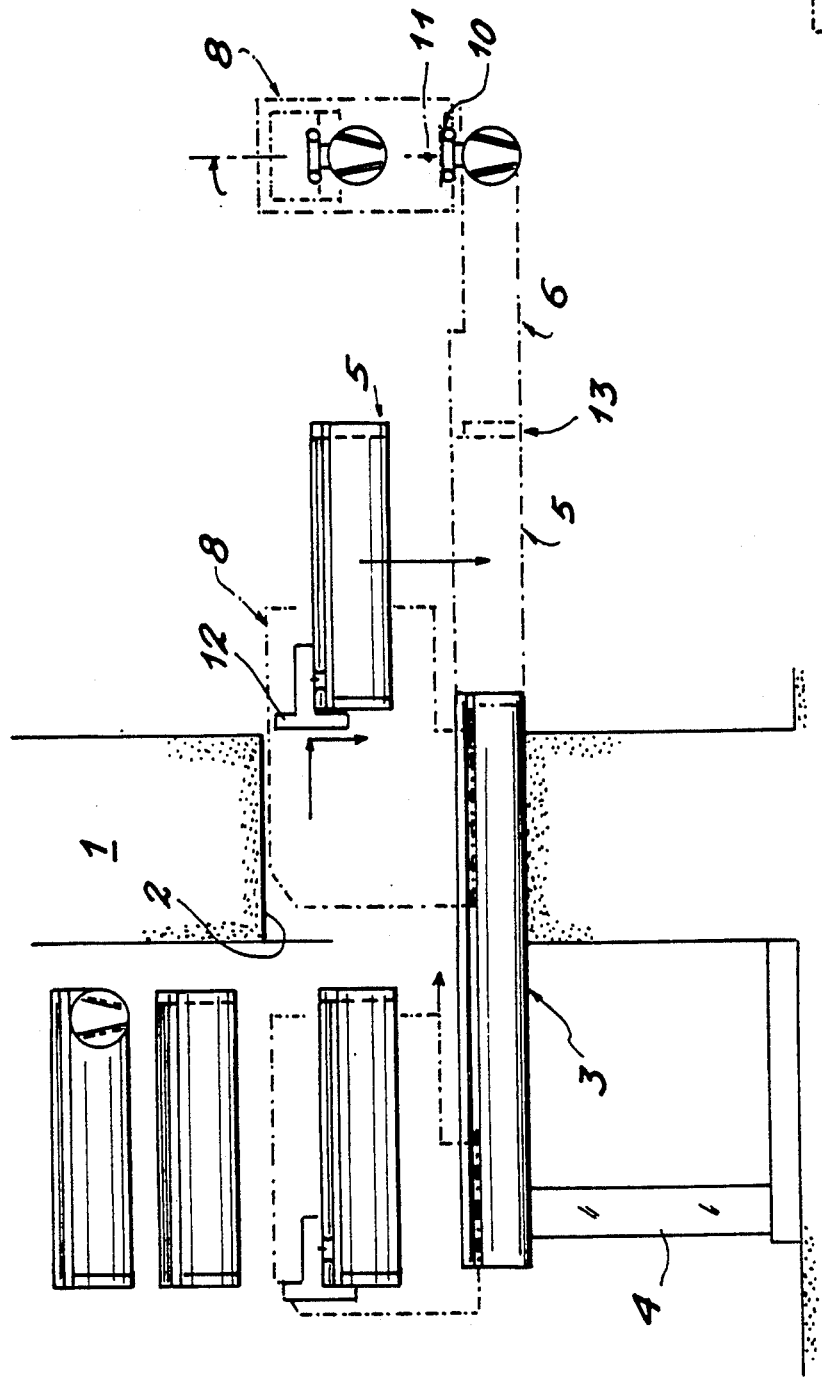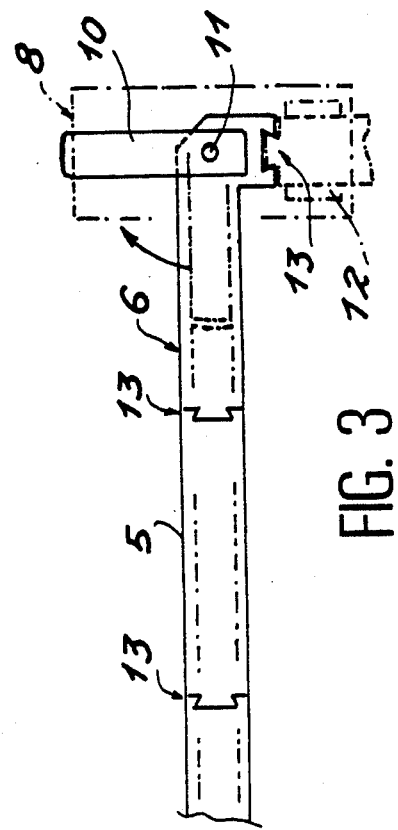

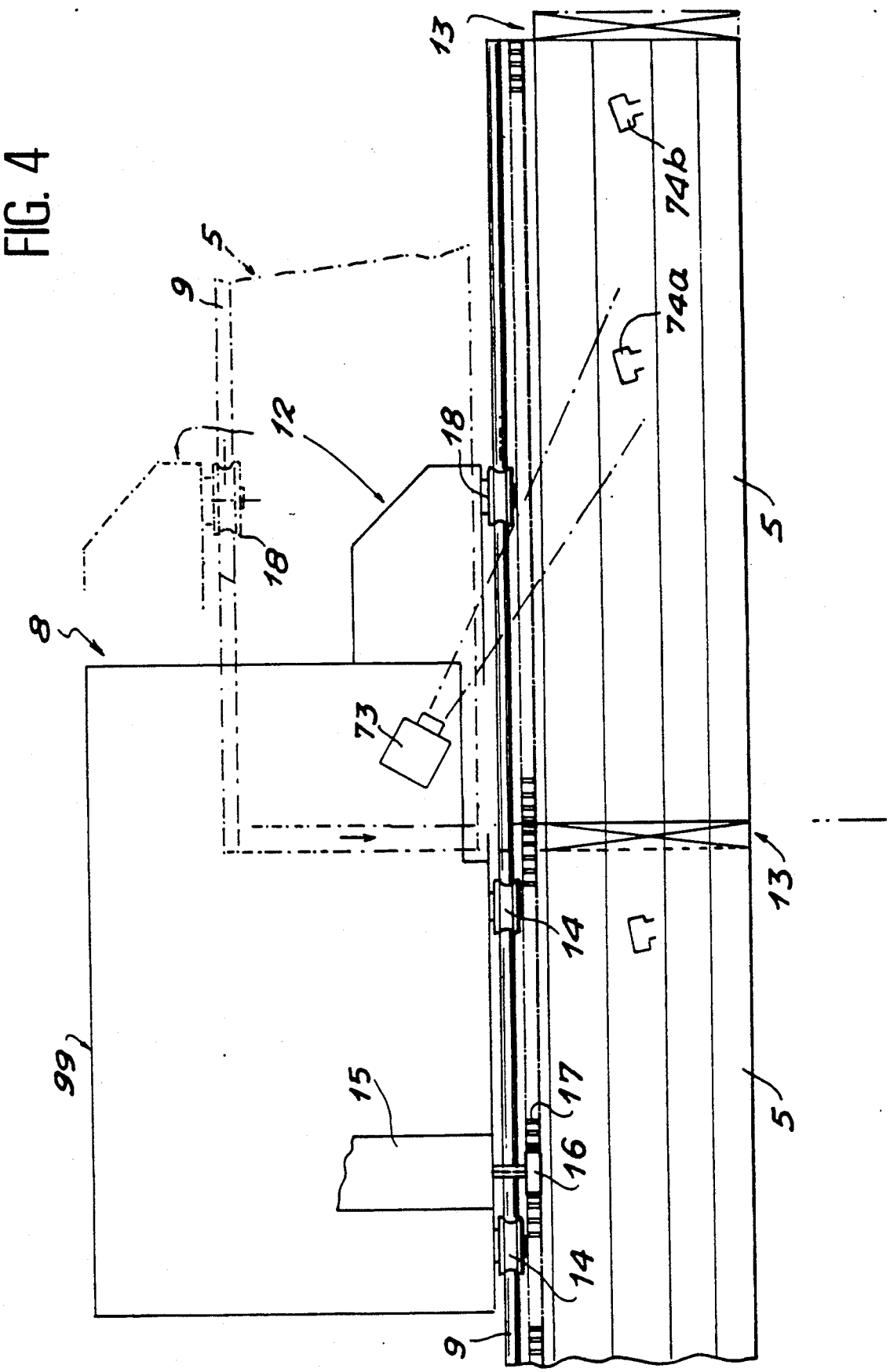

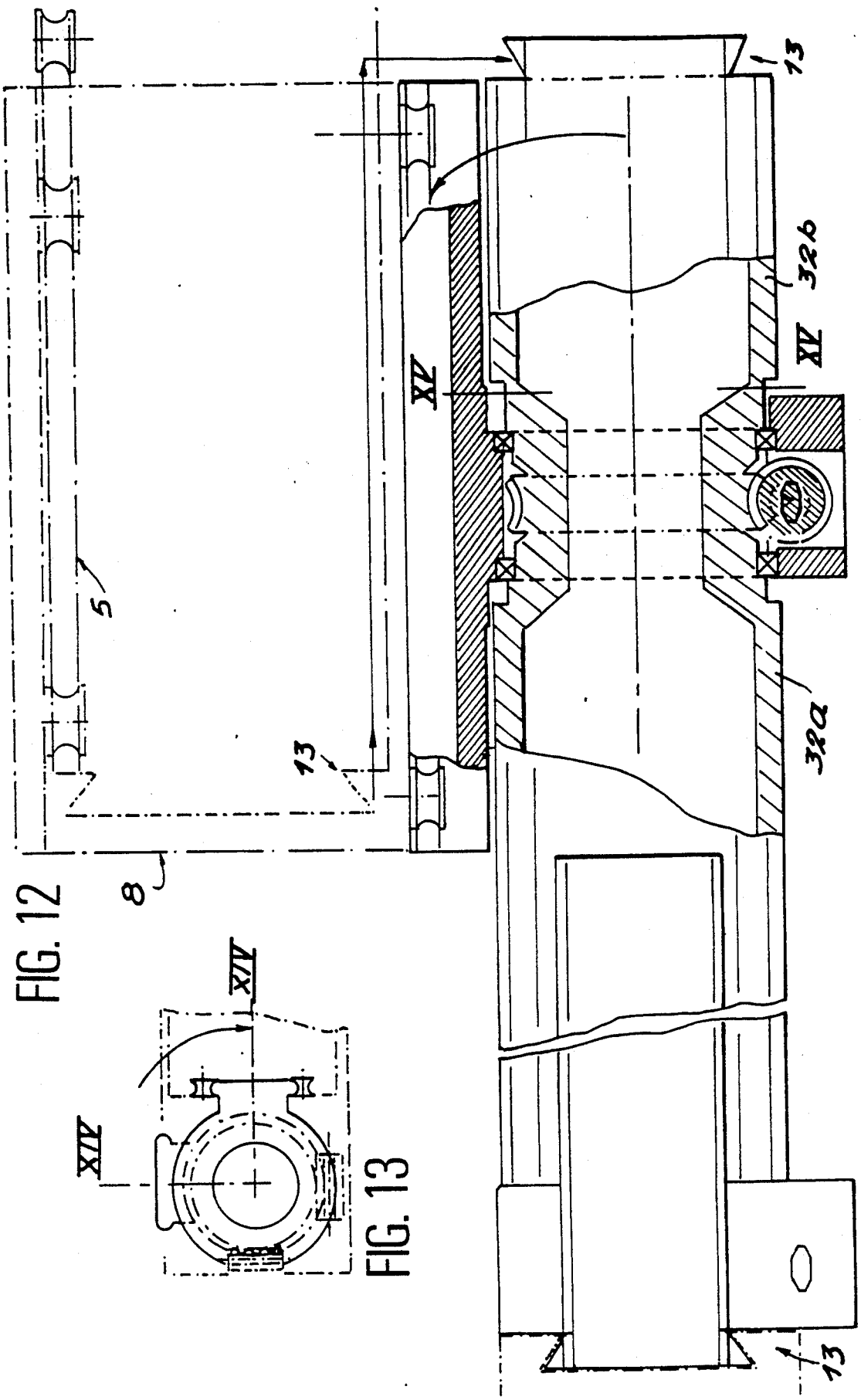

VEHICLE FOR THE AUTOMATIC LAYING OF A TRACK BY A VEHICLE TRAVELLING ON SAID TRACK AND TRACK DESIGNED FOR INSTALLATION BY SUCH A VEHICLE

BACKGROUND OF THE INVENTION

The invention firstly relates to a vehicle for the automatic laying of a track on which it travels and also to a track designed for installation by such a vehicle.

It is used when it is necessary to carry out work within a contaminated enclosure or an enclosure which is inaccessible for some other reason. The work has to be carried out by robots, which does not in itself cause a problem, provided that they are able to approach their intervention location, which is often impossible with conventional vehicles carrying robots, because the locations can be at very different heights or may be surrounded by obstacles rendering them inaccessible.

SUMMARY OF THE INVENTION

The invention obviates such problems in numerous cases. Its object is the establishment of a track in space and which can be curved or stepped form so as to be able to theoretically reach any random point within the enclosure. The track is cantilevered as from an embedded end located outside the dangerous area and which serves as a starting base for the tool-carrying robot.

However, it is necessary to be able to lay or construct the track without human intervention. It is for this reason that a vehicle has been designed, which travels on said track and which is continuously able to lay new track elements one following the other once it has reached the end of the already laid track. This vehicle is characterized in its most general form by a chassis, as well as means for adhering to and travelling on the track, together with a carriage moving perpendicular to the track in the chassis and having means for holding a track element and placing it in front of the track elements already joined end to end.

An end of track detection sensor can advantageously be provided on the vehicle, as well as a position sensor of the element held by the carriage in order to check that it is in the desired longitudinal position at the time when it has to be laid.

As it is preferable to secure against failure of the end of track detection sensors, it is possible to add a track end stopping means to the chassis. In accordance with the invention the stopping means comprises a lever articulated to the chassis, and having a free mobile end on the track. An opposite end of the lever is articulated to the chassis and provides a step which abuts a wall at the end of the track when the free end projects beyond the end of the track.

The chassis guiding and advancing means includes transverse rollers or pulleys gripping slideways or slide bars of rails provided by the track elements joined end to end. An identical arrangement is practicable for holding the track elements in the carriage. With such a design, the vehicle is unable to fall from the track no matter what the inclination of the latter. The track elements previously held by the carriage can be released after the track elements have been laid by advancing the vehicle until the carriage rollers pass out of the rod or slideways.

The vehicle can also be provided with means for modifying the state of the mobile parts of the track or for locking the elements together. It can be in the form of a key member rotating about a spindle perpendicular to the track and which is provided with an end having a flat notch or a flat projection.

The track can comprise a rod or slideway-carrying body in extension on the elements joined end to end and a rack parallel to the slideways and on which engages a pinion belonging to the track vehicle displacement means. The elements can be terminated by couplings having sliding engagement and vertical abutment, such as tapered dovetails. Among other optional characteristics which can be used separately or in combination, it is possible to add to the or in combination, it is possible to add to the elements one or more stop marks at the end of the elements for the optical or other end of track sensors, or a longitudinal notch terminated by an abutment wall in order to retain the end of track stop means. The direction change means can be provided with a part rotating about an axis perpendicular to the track for bent elements or assume the form of track inclination elements designed, in the effectively constructed embodiment, in the form of elements having a rotary part able to pivot about the axis of the element. The inclination is ensured by an adjacent bent element and used in combination. Such an arrangement makes it unnecessary to interrupt the rigidity of the track.

The rotary parts are preferably actuated by an irreversible mechanism, having a clearance and friction for reasons which will be described hereinafter in conjunction with the use of a flat notch or projecting key member.

BRIEF DESCRIPTION OF THE DRAWINGS

The invention is described in greater detail hereinafter relative to non-limitative embodiments and with reference to the attached drawings, wherein show:

FIG. 1: A general view of a track produced according to the invention.

FIG. 2: The track starting point.

FIG. 3: Certain special features of the track.

FIGS. 4, 5, and 6: The laying of an element and certain features of the vehicle.

FIG. 12: An inclination element.

FIG. 13: How said element is used.

DETAILED DESCRIPTION OF THE PREFERRED EMBODIMENT

The track shown in FIGS. 1, 2 and 3 extends within an enclosure 1 defining a hostile atmosphere. The enclosure 1 has an opening 2 through which extends the track in order to form, outside said enclosure 1, a starting portion 3 embedded in a support 4 by a weld or bolted joint. The starting portion 3 is used for the introduction of vehicles on the track, their removal and the loading of different equipment. Openings or manipulating means, such as locks and glove boxes, are located on the side of the starting portion 3 and make it possible to perform these operations manually.

Figure 21:
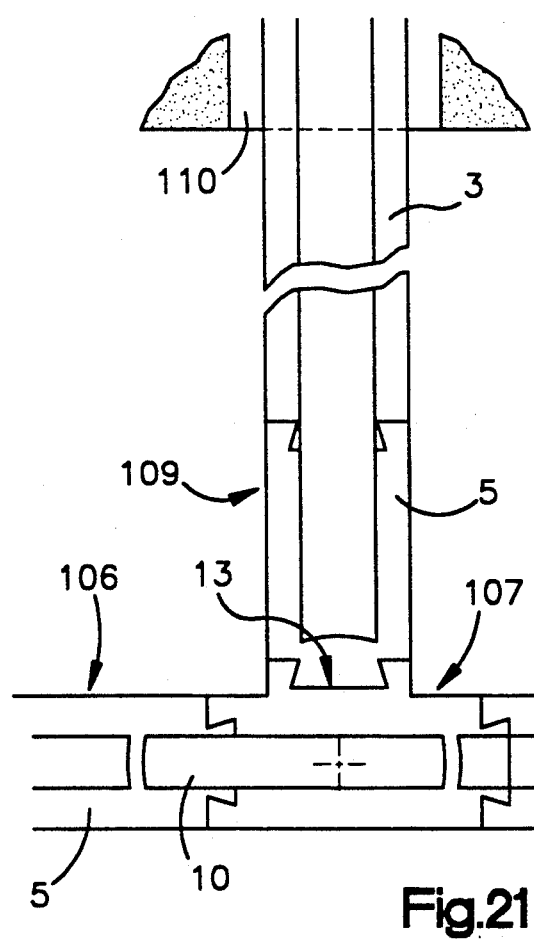
FIG. 21: Another type of track with branched elements.

However, the track essentially extends within the enclosure 1 and is constituted by elements joined end to end in succession and of which three different types occur. Most are in the form of straight elements 5, whose section is uniform and whose shape is immutable, bent elements 6 making it possible to change track direction and inclination elements 7 formed from two parts pivoting with respect to one another about the axis of the element. Such an inclination element 7 in combination with a bent element 6 makes it possible to modify the gradient of the track beyond the same and therefore its height. These elements and specific means making it possible to control them will be described hereinafter. The starting portion 3 can be looked upon as a fourth type of track element used for embedding purposes. A fifth type, which allows branching actions and which in fact constitutes a switch point, will be described relative to FIG. 21.

A vehicle 8 travels on the track or more specifically on a pair of slideways 9 or parallel bars or rods at the top of the elements 5, 6 and 7 constituting the track and which extend on all the rectilinear portions of the track. However, discontinuities are inevitable with the chosen design, i.e. curve-free, with respect to the bent elements 6 and inclination elements 7. The bent elements 6 have a plate 10 rotating about a spindle 11 and which extends over most of their height to essentially comprises the slideways 9 of said bent element 6. The rotation of the plates 10 when the vehicle is located on their slideways 9 modifies its direction and aligns it with one of the adjacent track portions.

The vehicle 8 is manually inserted around the slideways 9 by the end of the track starting portion 3. It firstly comprises an inert chassis 99, which carries a carriage 12 able to hold a track element 5, 6 or 7 and which is vertically movable (or more generally perpendicular to the track) with respect to the chassis 99, so as to lower the held track element and then raise it again. It consequently constitutes an elevator. It can be seen that if the vehicle 8 is at the end of the already installed track, the held element could be placed in extension of the preceding element and assembled therewith by a dovetail coupling 13 at the end of all the elements 5, 6 and 7. Thus the track is constructed element by element. Once the carriage 12 has returned to its initial position and the vehicle 8 has passed out of the enclosure 1, a new element can be loaded onto the carriage 12 and the vehicle 8 will lay it so as to further extend the track.

FIG. 4 is a more detailed view of the vehicle 8 and the track in the direction of FIG. 2 and shows that the vehicle 8 slides on the track by means of two pairs of rollers or pulleys 14 having a central groove and which are located on either side of the slideways 9. Thus, each pair of rollers 14 grips around the slideways 9. Thus, no track inclination can pull the vehicle 8 off the track. A motor 15 drives a pinion 16, which engages in a rack 17 belonging to the elements 5, 6 and 7 and parallel to the slideways 9 in order to advance the vehicle 8 on the track. The carriage 12 holds the element to be laid at the end of the track with the aid of two other pairs of rollers or pulleys 18, similar to those of the vehicle 8, but only one roller 18 is visible here. One of the rollers 14 or 18 of each pair rotates about a fixed spindle and the other about a spindle located at the end of a lever articulated at a fixed point and rotating in the plane of the slideways 9. The lever is pushed back by a spring towards the slideways 9, which are consequently gripped between each pair of rollers 14 or 18. Moreover, the spacing of the rollers 14 or 18 of each pair is automatically regulated so as to adjust it to the shape and position variations which may effect the slideways 9.

Figure 5:
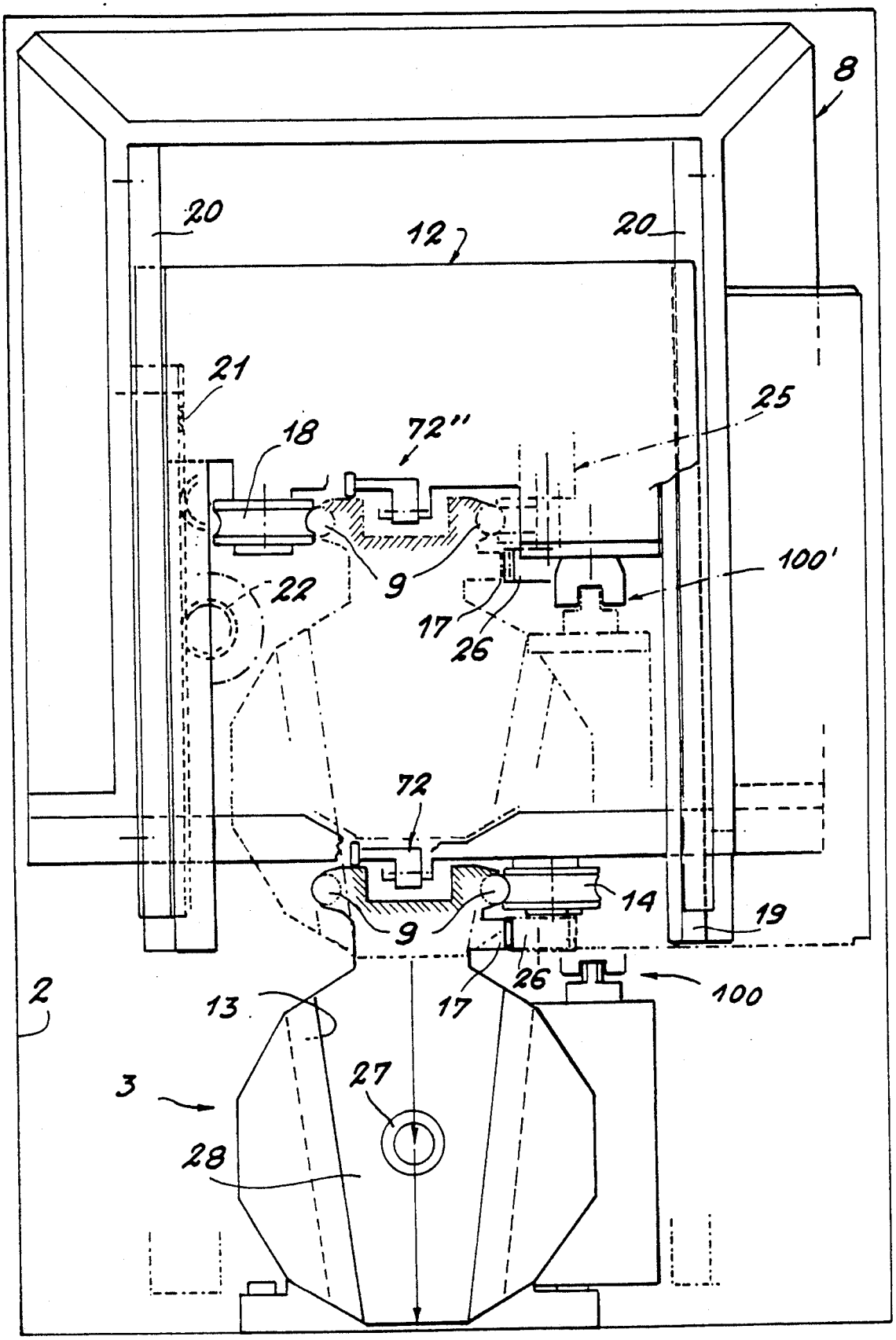
Figure 6:
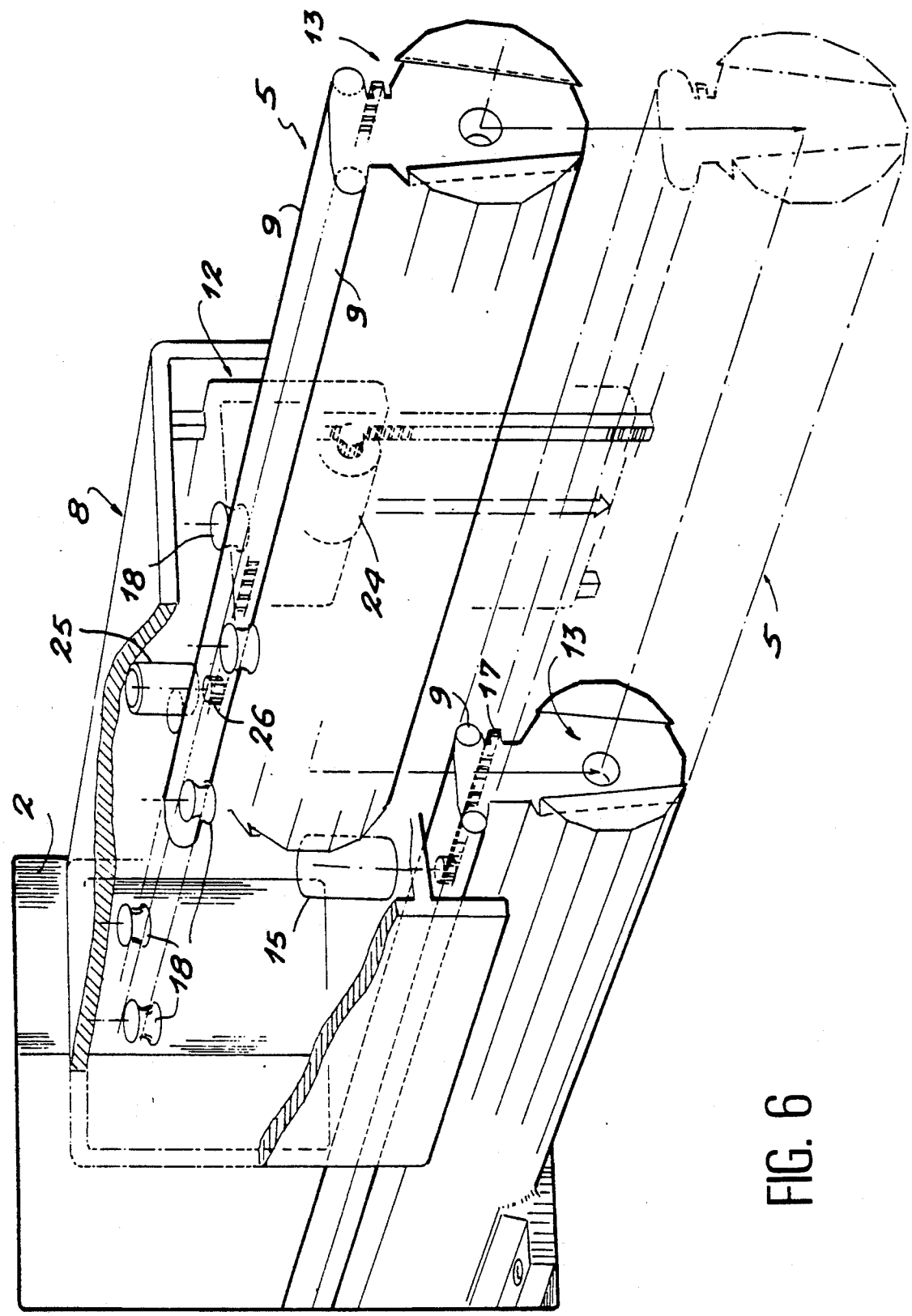

Reference should now be made to FIGS. 5 and 6. The vehicle 8 is open towards the front and rear to give a passage for the held track element. The carriage 12 comprises vertical profiles having a U-shaped section 19, which slide in posts 20 serving as vertical slideways for the two sides of the vehicle 8. A vertical rack 21 is also located on one of the sides of the vehicle 8 and a pinion 22 actuated by a motor 24 located on the carriage 12 makes it possible to lower or raise the same as required. When the previously held track element has been laid, the carriage 12 is freed by advancing it on the track until its rollers 18 pass out of the slideways 9.

A pinion 26 then engages with the rack 17 of the element held by the carriage 12 and makes it possible for the held element to advance in order to bring it in front of the preceding element when the vehicle 8 remains stationary after reaching the end of the track. A motor 25 rotates the pinion 26.

Figure 7:
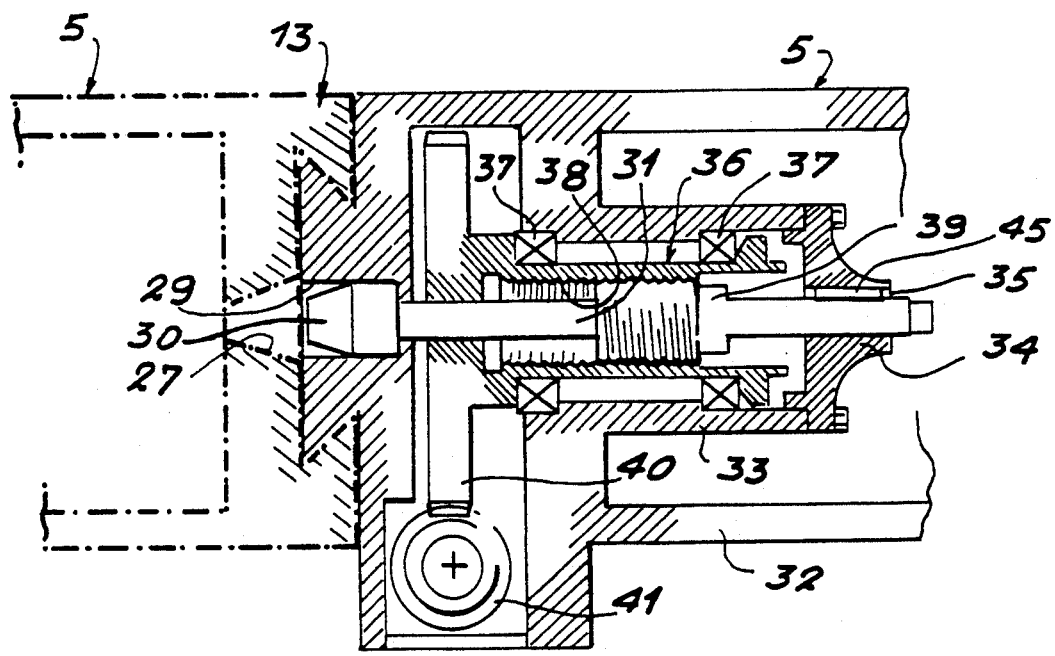
FIGS. 7 and 8: More specifically the locking mode.
Figure 8:
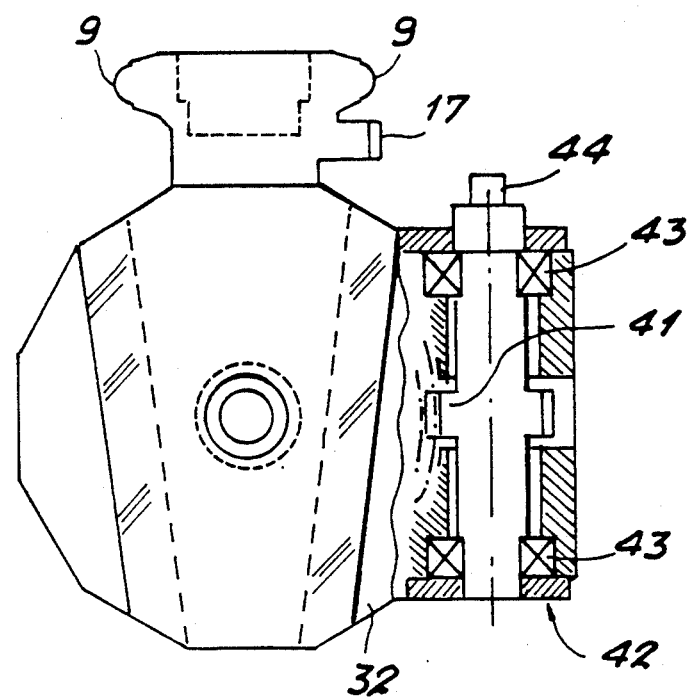

It can be seen that the dovetail coupling 13 tapers downwards, which prevents the element from dropping when it is released. A hole 27 is made in the centre of the bottom face 28 of the recessed dovetail side 13. The hole 27 is used for the locking of the elements, which will be described relative to FIGS. 7 and 8. The projecting side of the coupling carries another hole 29 in which is located a locking bush 30 fixed to the end of a finger 31 sliding axially within the elements 5, 6 or 7 of the track. In this connection it is pointed out that the elements 5, 6 and 7 have, besides the slideways 9 and the rack 17, a profile located below them and whose function is to give the track the necessary mechanical strength and rigidity. It is therefore advantageously a polygonal or circular and hollow profile, i.e. it can contain a certain number of mechanisms, one of which is now being described. Stiffening ribs can partition the interior of the profile.

The cylindrical wall of the profile of the elements 5, 6 and 7 is designated 32. It carries an inner tube 33 terminated in its part remote from the dovetail coupling 13 by a small cap 34 having a central opening 35 through which passes the end of the finger 31. The inner tube 33 supports a jacket 36 by means of two bearings 37 mounted in such a way that the translation of the jacket 36 on the inner tube 33 is rendered impossible. The jacket 36 carries a tap 38 in which is engaged a threaded boss 39 of the finger 31, as well as a wheel 40 having helical teeth displaced by a pinion 41 having helical teeth. The pinion 41 is mounted on a vertical spindle extending into a compartment 42 projecting laterally adjoining the wall 32. Two bearings 43 allow the spindle of the pinion 41 to freely rotate and said spindle projects beyond the laterally projecting compartment 42 by a key end 44, which extends slightly to the side of the rack 17 and the slideways 9 and slightly below the same.

The engagement of the key member 44 by a control mechanism located on the vehicle 8 and which will be described hereinafter is responsible for the rotation of the spindle of the pinion 41, the wheel 40 and the jacket 36, together with the translation of the finger 31 by the engagement of the threaded boss 39 in the tap 38. A key 45 engaged in the central opening 35 and in the finger 31 prevents any rotation thereof. Finally, the bush 30 is introduced into the hole 27, which is conical like the end of the bush 30 in order to obtain a better centring and by means of which the slideways 9 are in precise extension of one another.

Figure 9:
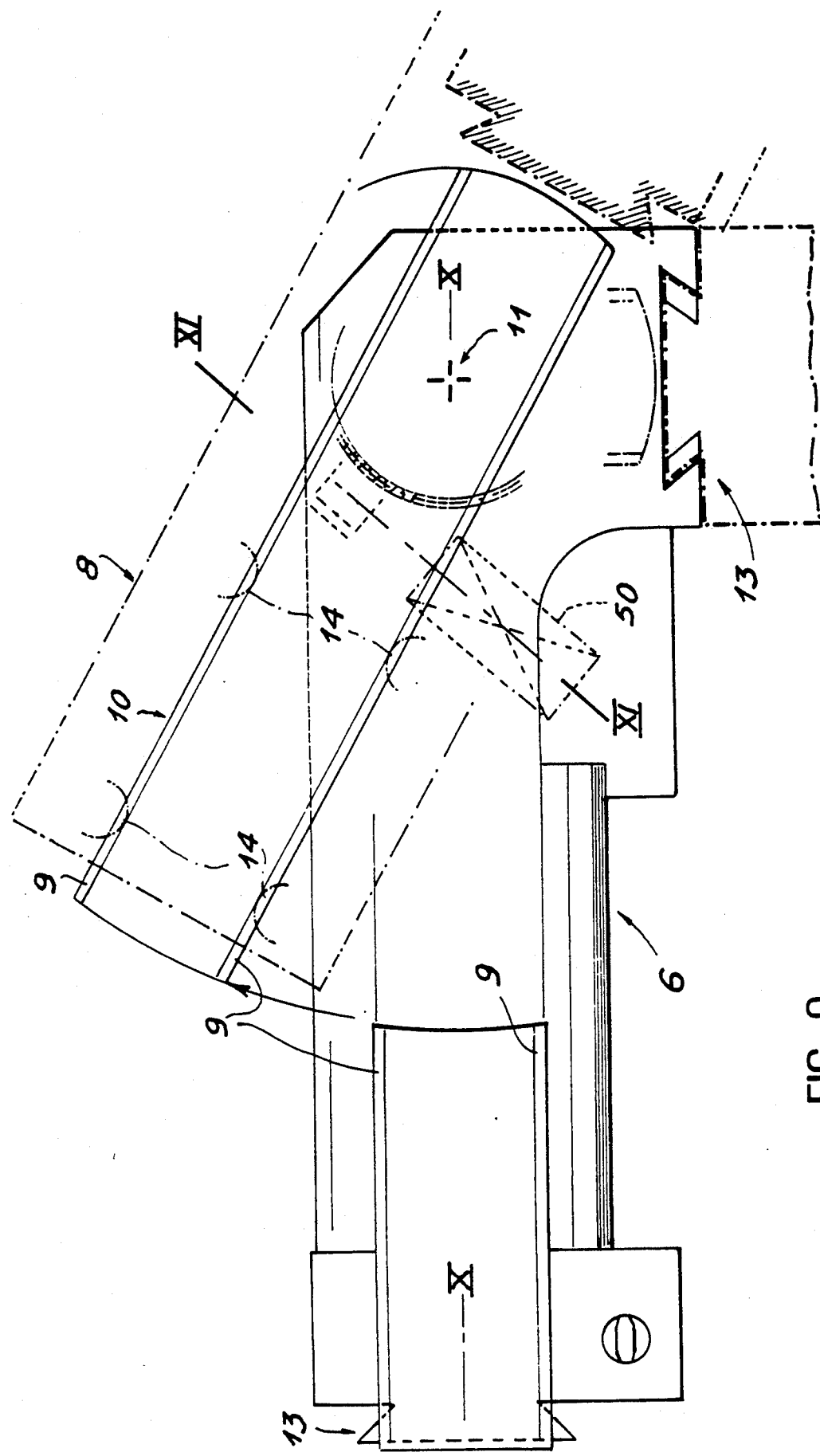
FIG. 9: A bent element.
Figure 10:
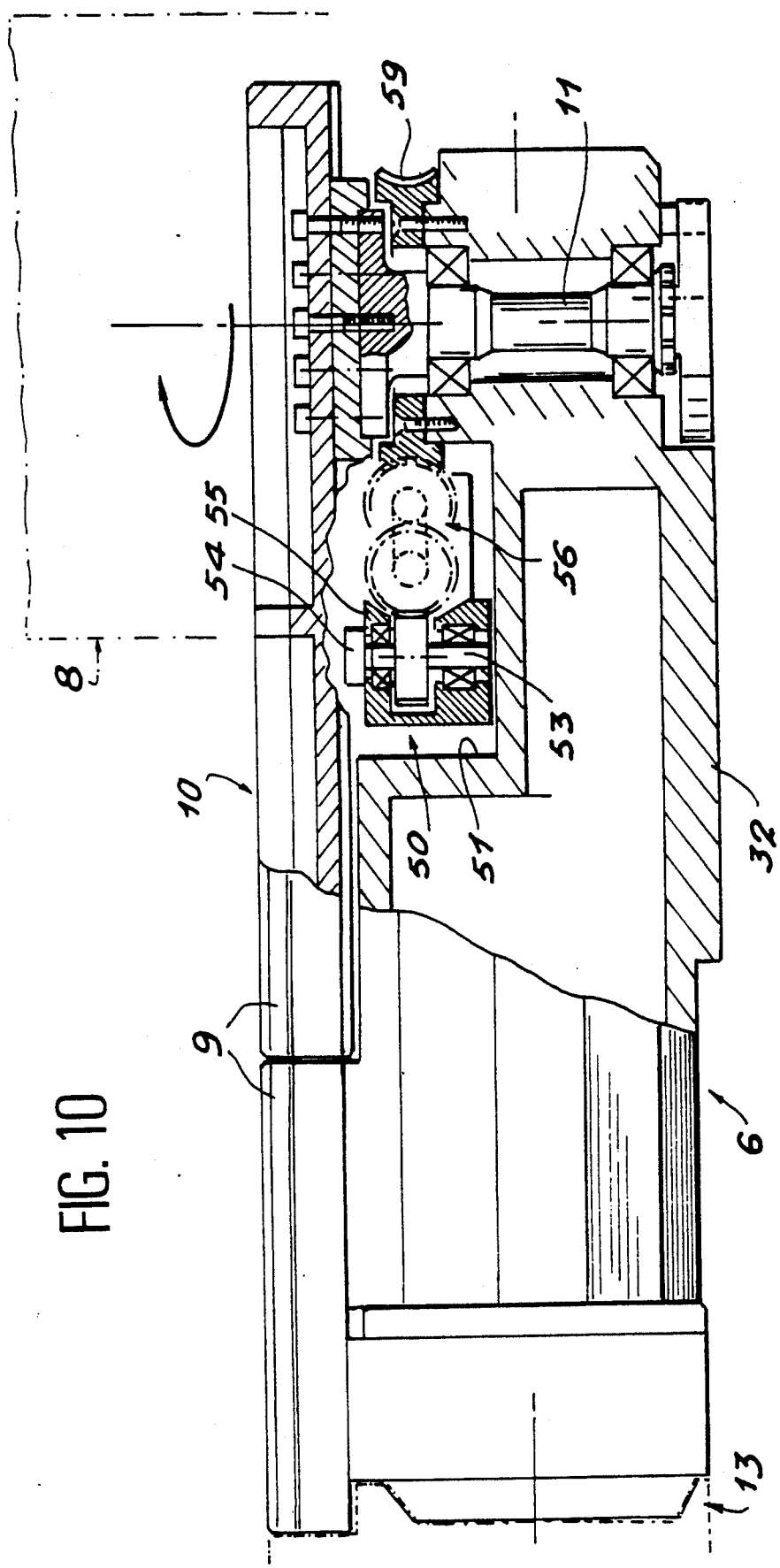
FIGS. 10 and 11: Two sections of the bent element along lines X—X and XI—XI of FIG. 9.
Figure 11:
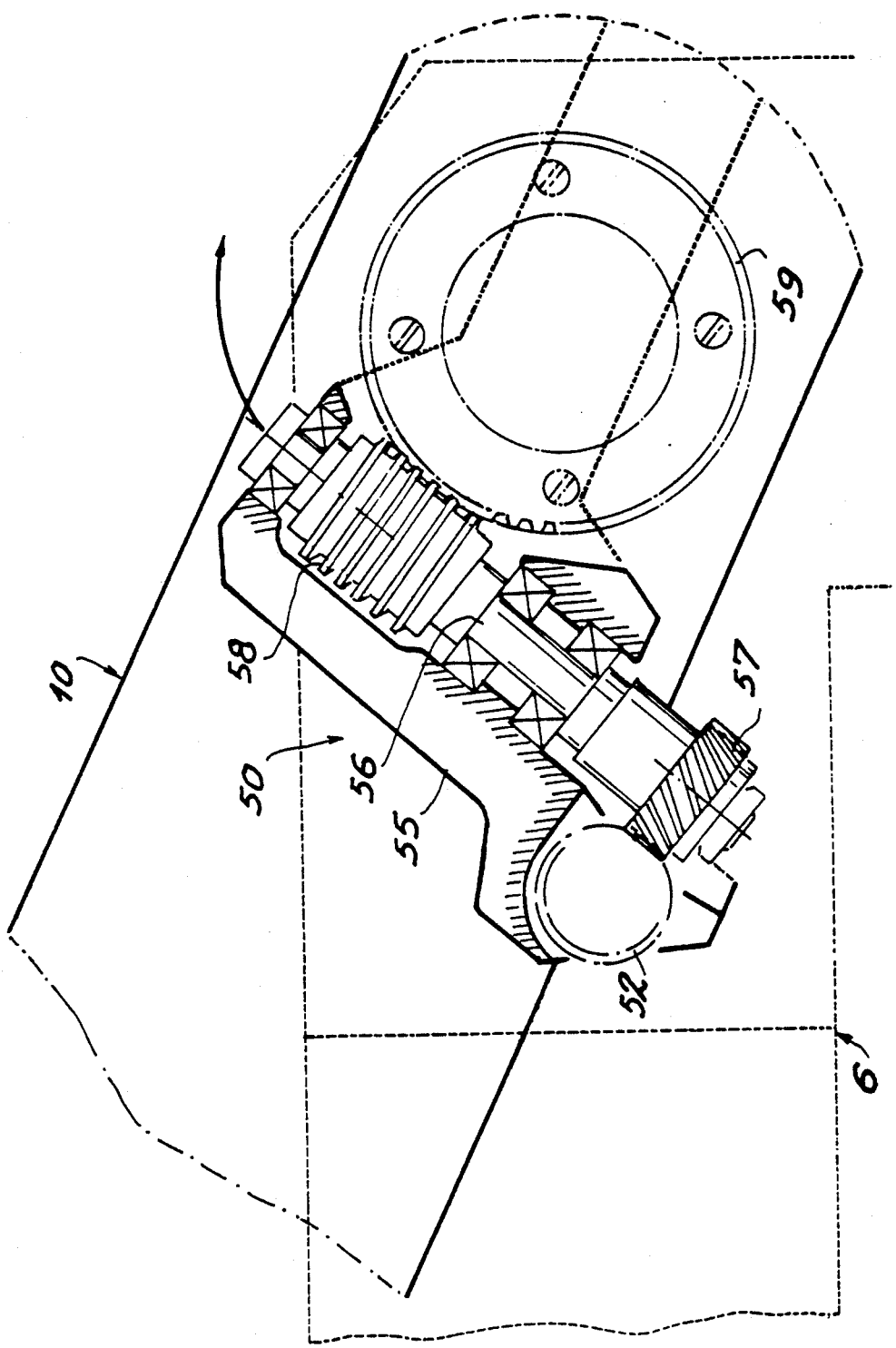
Figure 14:
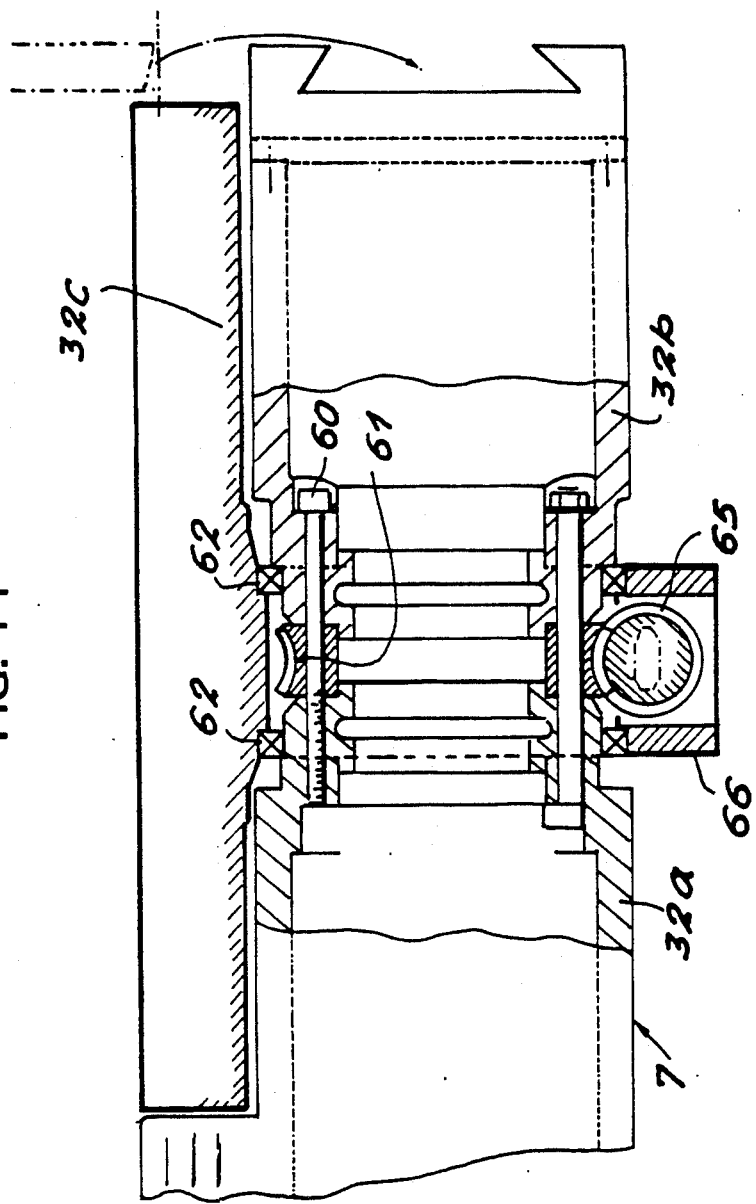
FIGS. 14 and 15: Two sections of the inclination element along lines XIV—XIV and XV—XV of FIGS. 13 and 12 respectively.
Figure 15:
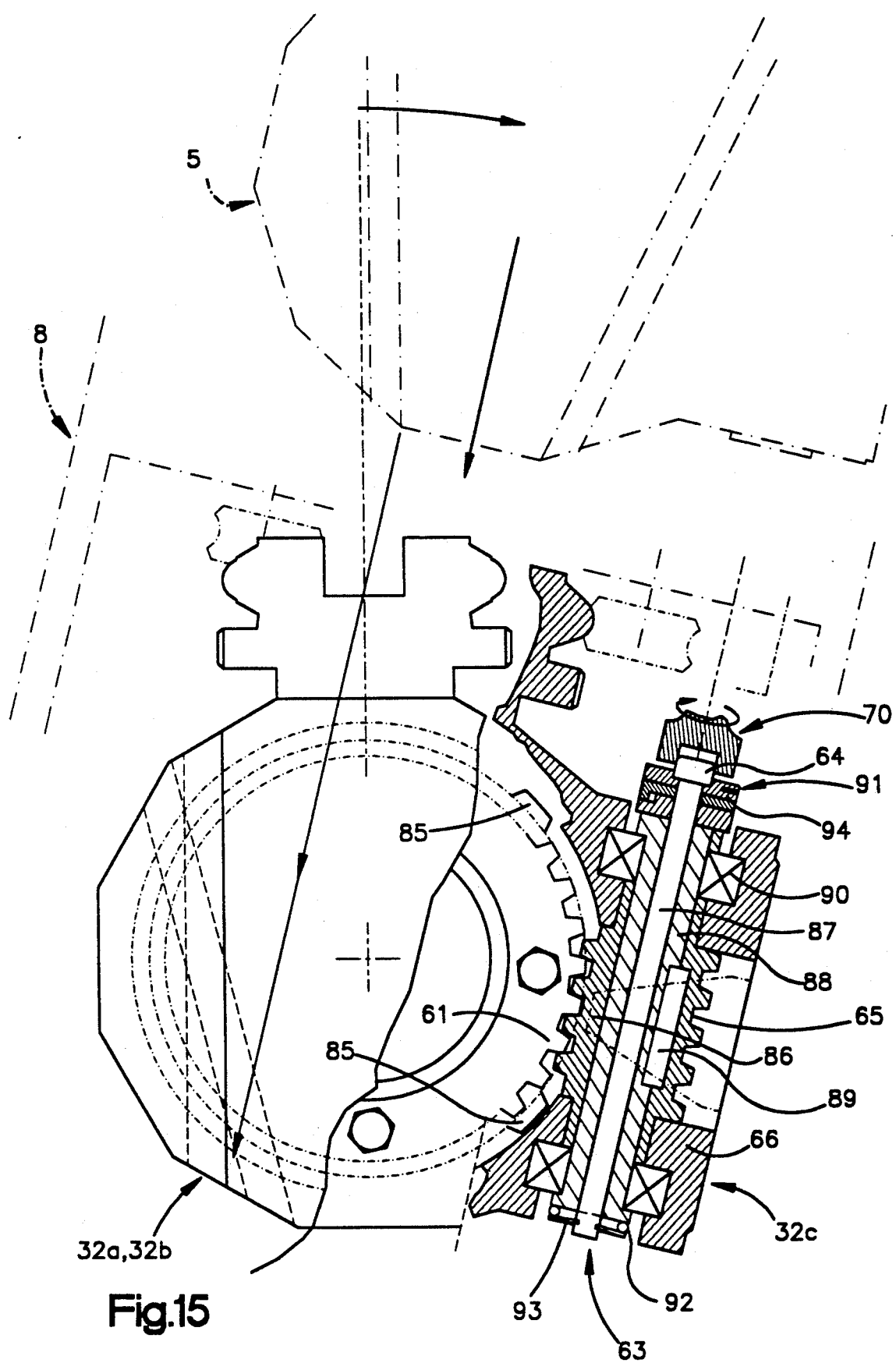

A description will now be given of the bent elements 6 more specifically shown in FIGS. 9 to 11. They are rectangular or more generally have a random shape. The rotation spindle 11 of the plate 10 is located at the top and the ends of the sides are constituted by dovetail couplings 13. The plate 10 is significantly longer than the base of the rollers 14, so that the vehicle 8 is exclusively engaged on the plate 10 when it is able to rotate it by actuating a control mechanism 50 laterally projecting over the plate 10 not far from the spindle 11. The control mechanism 50 is also (FIG. 10) partly located beneath the plate 10 and in a cavity 51 made as a result of a break in the wall 32.

The control mechanism 50 firstly comprises an endless screw or worm 52 rotating freely about a vertical spindle 53 and terminated upwards by a flat projecting key member 54. Two bearings rigidly maintain the spindle 53 in a small box 55 integral with the plate 10. The small box 55 also contains a horizontally directed, oblique transmission shaft 56, which rotates freely, while being held by other bearings in a fixed position in the small box 55. The transmission shaft 56 is provided with a pinion 57 displaced by the endless screw 52 and a secondary endless screw or worm 58 at its other end, which engages in a toothed wheel or ring 59 having concave teeth in order to ensure a maximum size engagement surface. The toothed ring 59 is screwed into the wall 32 and surrounds the spindle 11. The rotation imposed on the secondary endless screw 58 consequently produces forces on the small box 55 and therefore on the plate 10, which is made to rotate. The vehicle 8 controls rotations of the plate 10 until the portions of the slideways 9 which it carries form extensions of adjacent fixed slideways.

With reference to FIGS. 12 to 15 a more detailed description will now be given of the inclination element 7. Their wall 32 is subdivided into two parts 32a, 32b connected by screws 60, which compress a toothed ring 61 between the parts, while maintaining them integral. The wall 32 also comprises a ring 32c, which surrounds the part 32b which is significantly shorter than the other part and the end of the part 32a about which they can rotate via a pair of bearings 62 on either side of the toothed ring 61. The bearings 62 are roughly located in the center of the ring 32. The outer part 32c consequently carries the end of the slideways 9 in accordance with the requirement expressed in connection with the bent elements 6, i.e. that the length must exceed the base of the rollers 14, while still enabling the vehicle 8 to have access to a control mechanism 63 which, like the previously described control mechanism, laterally projects to the side of the part 32c. This control mechanism 63 also comprises a key member 64 alongside the slideways 9 and the rack 17 and below the same, which controls an endless screw 65 held by bearings 90 having an axially fixed position in the box 66 of the control mechanism 63. The endless screw 65 meshes with the toothed ring 61, which is kept fixed by screws 60. The box 66 and the wall part 32c integral therewith, which are consequently rotated about the bearings 62.

The dovetails 13 at the end faces of the parts 32a, 32b are oriented in different directions, which define the characteristic inclination angle of each element 7 and which is a right angle in the example shown in FIGS. 12 and 13.

Figure 16:
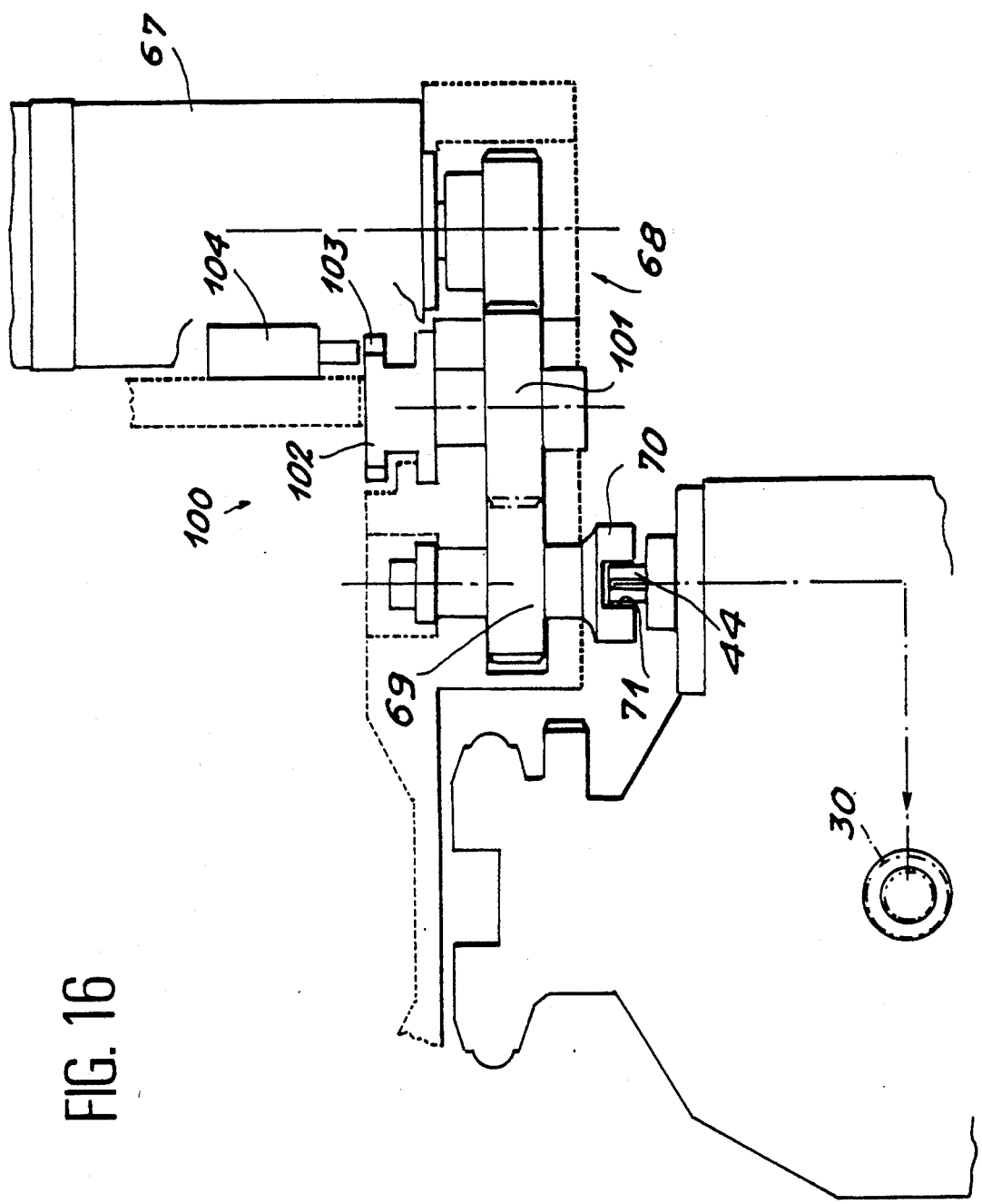
FIGS. 16: In cross-section the nature and use of the mechanism for locking and actuating the mobile parts.

It is pointed out that all the control key members for locking and displacing the mobile parts are of the same flat projection type. They are also located on the same side of the elements 5, 6, 7, which optionally makes it possible to control them by a common mechanism 100 shown in FIG. 16 and which consists of a motor 67 driving a gear drive 68 terminated by a vertical shaft 69, which is itself terminated by a key member 70 having a rectilinear notch or recess 71. The rectilinear projections of the displacement and locking axes enter the notch 71 and it is then only necessary to stop the vehicle 8 in order that the motor 67 can rotate the key members. However, the principle of such a mechanism makes it necessary for the projections and notches 71 to always be in extension so that engagement can take place and that the key member 70 does not strike the flat projections, i.e., in the local longitudinal direction of the track.

The motor 67 may only rotate the shaft 69 by an integral number of half-turns. This requirement can easily be reconciled with that of a precise positioning of the mobile parts, particularly due to the clearances provided in the transmissions. On returning to FIG. 15, it can be seen that the part 32b is provided with two angular abutments 85, which limit the travel of the ring 32c by stopping a block 86 screwed thereto.

The key member 64 is extended by a spindle 87 to which it is rigidly connected. A sleeve 88 surrounds the spindle 87 and is connected to the endless screw 65 by a key 89. Two bearings 90 maintain the sleeve 88 in the box 66. Moreover, two washers 91 are axially locked between the key member 64 and the sleeve 88 by means of a joint 92 compressed between the other end of the sleeve 88 and an elastic ring 93 inserted around the spindle 87 opposite to the key member 64. It is also pointed out that the key member 64, the washers 91 and the end face of the sleeve 88 on which they bear have thickness changes, so that these parts slightly overlap one another and face one another by three pairs of stepped, longitudinal faces 94.

When the mechanical abutment is established, it is possible to rotate the key member 70 until the rectilinear projection and notch 71 have the desired longitudinal orientation, which is necessary for freeing the key member 70 on advancing the vehicle 8. The rotation imposed on the key member 70 is the reverse of that permitting the abutment and has an angle at the most equal to a half-turn. It brings about the separation of pairs of stepped faces 94, which have significant clearances, so that no movement is now transmitted to the sleeve 88 and therefore to the ring 32c, which remains in the desired position. The locking effect exerted by the joint 92 prevents as a result of the friction which it causes any accidental rotation of the key member 64 until the vehicle 8 returns (otherwise it would be locked due to the inability of clearing the inclination element 7 on seizing the key member 64). The advantage of using an endless screw is that such a transmission mechanism is irreversible and consequently the ring 32c is maintained in place.

Similar, not shown mechanisms with frictional joints and stepped washers provide an angular clearance for the key member and abutments defining stop positions exist for the locking systems of the elements 5, 6, 7 and the control of the plates 10, their operation being the same.

However, the construction shown has another control mechanism 100' similar to the preceding one, although this duplication is not necessary. It is located on the carriage 12 and shown in FIG. 5. It is responsible for the locking of the elements 5, 6, 7, while the other is used for controlling mobile portions of the elements 6 and 7. A simpler design results from this. The second control mechanism 100' is positioned in such a way that it grasps the key member 44 for locking the element held at the time when the latter is lowered with the carriage 12.

For checking the correct angular position of the key member 70, the gear drive 68 comprises a shaft 101 above which projects a disk 102 having recesses 103 regularly distributed over its periphery and whose number is such that each half-turn of the member 70 passes one of the recesses 103 in front of a sensor 104. Moreover, the longitudinal orientation of the notch 71 is established when a recess 103 is in front of the sensor 104.

Figure 17:
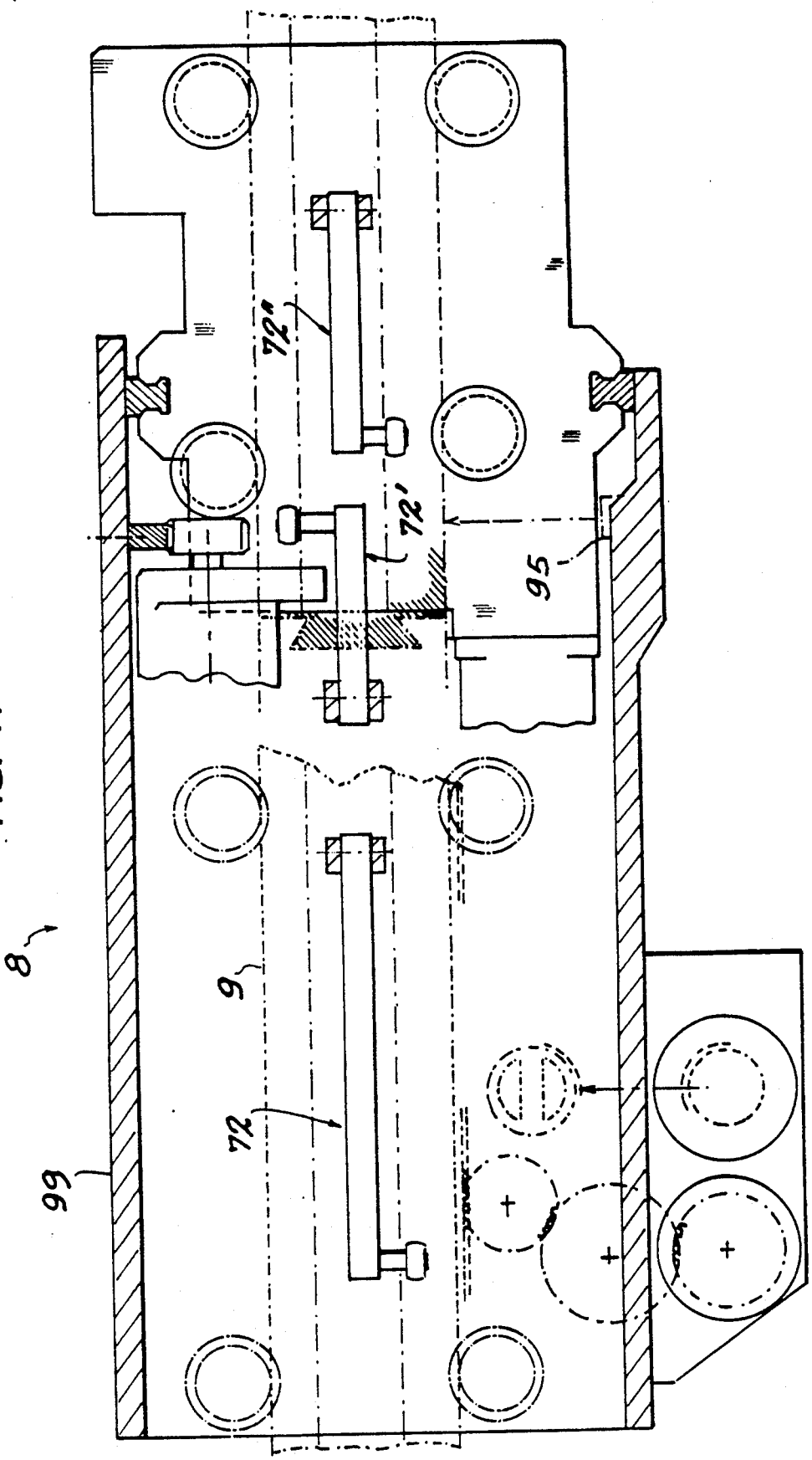
FIG. 17: A plan view of the locking and actuating mechanism on the vehicle, as well as the end of track stop means.

The vehicle 8 is again shown in FIG. 17. It is possible to see levers 72 for preventing the vehicle 8 from falling if it passes beyond the end of the track. There are sensors 73 (FIG. 4) able to detect marks 74 located on a generatrix of the walls 32 of the elements 5, 6, 7. More specifically, the marks 72 are located towards the end of each element and it is possible to see a first mark 74a, which indicates to the vehicle 8 that it is necessary to slow down and a second mark 74b indicating stoppage. The marks 74 are identical and are constituted by a sheet metal portion, which projects laterally from the wall 32. Marks of other types such as reflecting points or other signs can also be used as a function of the nature of the sensors 73, i.e. optical, inductive, etc. It is obviously necessary to provide the control system for the vehicle 8, which is essentially of an electronic nature, with a memory enabling it to count the already laid track elements and thus deduce therefrom the number of marks 74 which can be ignored, because they are no longer at the end of the track.

Figure 18:
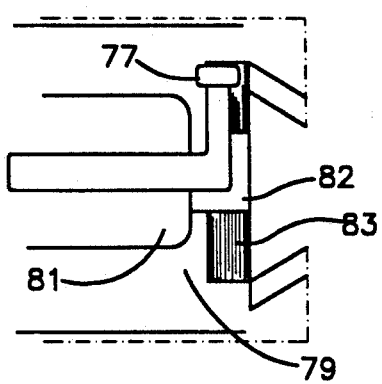
FIGS. 18 to 20: The stop means in other forms.
Figure 19:
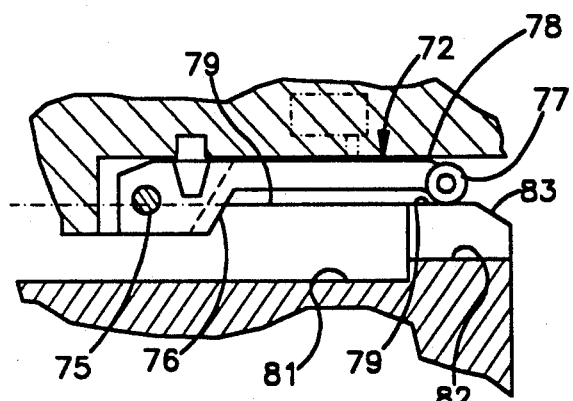
Figure 20:
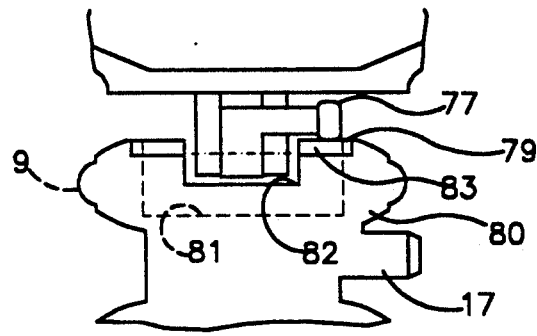

Similar marks exist for limiting the horizontal displacement of the rail held by the carriage 12. However, the lever 72 has been provided for preventing the vehicle 8 dropping if the indications of the sensors 73 were erroneous. As can be seen from FIGS. 18 to 20, the lever 72 comprises a rod located below the chassis of the vehicle 8 pivoting about a horizontal, transverse spindle 75 and provided with a step 76 at mid-length on its lower face and a castor 77 at its front end.

The castor 77 is located on a transversely curved end 78 of the lever 72, so that it rolls on a planar track 79 of the support 80 of the slideways 9 and the rack 17. The support 80 is a uniform profile, whose section is adapted to the specified functions and which is rigidly connected to the wall 32 by screws. It has a cavity 81 between the support portions of the slideways 9 which is partly closed by a low wall 82 at the end of each track element 5, 6 or 7. When the castor 77 reaches an open space after clearing the end of the track, the lever 72 pivots downwardly about the spindle 75. However, the vehicle 8 continues to move until its progression is interrupted by the step 76 encountering the low wall 82. It is then necessary to move back the vehicle 8. The track 79 is terminated by a zone 83 having a significant gradient, which makes it possible to raise the lever 72 by allowing the castor 77 to roll upwards. Each element 5, 6 or 7 has a track 79, which starts with a similar, but reverse gradient, so that the castor 77 only undergoes a brief lowering and then immediately rises as soon as it meets the following element 5, 6 or 7. This arrangement must also be ensured at the junction between the fixed mobile parts of the bent and inclination elements 6, 7 respectively in order to prevent any initial incorrect positioning. A lever 72' similar to the lever 72 but located at the rear and symmetrically makes it possible to eliminate the same risk during the return of the vehicle 8 if it has been forgotten to correctly actuate the mobile parts of the elements 6 and 7. If the inclination of the vehicle 8 can become such that the dropping of the levers 72 or 72' is no longer ensured, they can be constrained by a slightly compressed spring, which forces them below the vehicle 8. A similar device is provided on the carriage 12 for preventing the held element from being excessively advanced thereon.

A lever 72" shown in FIGS. 5 and 17 is free to pivot between the pairs of rollers 18 in order to retain the held element if the latter has excessively advanced. The track elements have shapes such that they abut against the vehicle 8 if they are inadvertently pushed rearwards, unless the carriage 12 is lowered. An optical or inductive sensor 95 is provided on the carriage 12 to stop the advance of the held element under normal conditions, the lever 72" only fulfilling a safety function. Another sensor can be added to stop the vertical movements of the carriage 12.

The different motors of the vehicle 8 are controlled by an electronic system positioned outside the enclosure 1 and supplied by an ordinary electric power supply. The connections are constituted by electrical wires pulled by the vehicle, which causes no special problem provided that the track is not excessively long or complicated as regards shape. The wire system is designated 97 in FIG. 1 and the electronic system 98. It would be possible to control the motors by radiowaves and to supply them by a battery positioned on the vehicle 8, or to have electricity conducting tracks, on which would rub collecting brushes located on the vehicle 8. Such tracks could be positioned close to the slideways 9. In connection with the elements 6 and 7 having mobile parts, it is necessary to establish a permanent bypass connection between the two elements which they would join and which would continuously supply the track fragment located on the mobile part, no matter what the position thereof, unless a rechargeable battery was provided on the vehicle 8.

The track must have an overhang section of approximately 6 meters and carry a load of 50 kg in the existing construction. Although this solution would not be suitable for numerous applications, it could be increased by the use of bifurcation bent elements 106 (FIG. 21) generally similar to the already described bent elements 6, but which would also have a direction change end 107 (e.g. at right angles) and a main track end 108 (e.g. in the extension of the already installed track part). A dead-end track 109 used as a support means would then be laid as from the direction change end 107 and would then overhang a bracket 110, which would serve as a support point or between the jaws of a vice which would then ensure a fourth take-up fixing on closing. The support would than be relieved.

When the intervention zone is reached, the laying vehicle 8 is withdrawn and replaced by another one, which carries the desired tool, but which is similar to the previously described vehicle, because it has means necessary for attachment to the slideways 9 and for moving along the track while moving the mobile parts thereof. These are mainly constituted by the carriage 12 and the ancillary, omitted mechanisms. A standard task in this field of activity is the changing of a pipe section, the tools then being used for dismantling or cutting and then fitting or welding the new section.

The dismantling of the track causes no realization or understanding problems, because it is performed by the operations which are the reverse of those already described.

We claim:

1. Vehicle for laying a track composed of elements (5, 6, 7) joined at ends and comprising a rail system (9, 17) on which said vehicle is guided and advanced, said rail system being continuous over the track, wherein said vehicle comprises a chassis (99) provided with guiding and advancing means (14, 16) engaged on the rail system of said track elements and a carriage (12) for transporting a carried track element (5) to be laid down at a free end of said track, said carried track element comprising a rail system, said vehicle and said carriage having means for guiding said carriage moving vertically on the chassis toward and away from the track, said carriage comprising guiding and advancing means (18, 26) engaged on the rail system of said carried track element.

2. Vehicle according to claim 1, further comprising sensors (73) for detecting the free end of said track.

3. Vehicle according to claim 1, further comprising sensors (85) for detecting at least one position of said carried track element with respect to said vehicle.

4. Vehicle according to claim 1, further comprising means (72, 72') for stopping said vehicle at the free end of said track.

5. Vehicle according to claim 4, wherein the stop means comprises a lever (72) articulated on said chassis (99) at a rear end (75) and having a forward free end (77) mobile on a flat portion (79) of said track and a step (76), between said ends facing towards said track, that is pulled forward above and along a part (81) of said track, said part of the track comprising a wall (82) near a forward end of each of said track elements so that said step of said lever passes clear of said wall of said track element when there is another track element toward the free end of said track, the forward end of the lever resting on said flat portion of said another track element, and said step of said lever impinges on said wall of said track element when said track element is at the free end of the track.

6. Vehicle according to claim 1, wherein each rail system comprises at least one rod (9) and said guiding and advancing means of the chassis and the carriage each comprise at least one pair of rollers (14, 18) having a grooved rim and straddling said at least one rod at two different portions thereof.

7. Vehicle according to claim 1, wherein each rail system comprises a rack (17) and the guiding and advancing means of the chassis and the carriage comprise motive pinions (16, 26).

8. Vehicle according to claim 1, wherein the carriage (12) has a constant position with respect to the chassis (99) along a track direction.

9. Vehicle according to claim 1, further comprising means (100) for displacing movable parts (10, 32c) on said track elements.

10. Vehicle according to claim 1, further comprising means (100') for locking said track elements together.

11. Vehicle according to claim 9, wherein the displacing means comprise a key member (70) rotating on said vehicle.

12. Vehicle according to claim 10, wherein said locking means comprise a key member (70) rotating on said vehicle.

13. Vehicle according to claim 11, wherein said key member is stationary on said vehicle except for rotation and comprises an end with a notch which is generally directed along said track and passed through, respectively, projections provided on rotating key members of locking mechanisms of said track elements.

14. Vehicle according to claim 12, wherein said key member is stationary on said vehicle except for rotation and comprises an end with a flat notch (71) or a flat projection, which is generally directed along the track and passes through, respectfully, flat projections or notches provided on rotating key members of locking mechanisms of said track elements.

* * * * *

UNITED STATES PATENT AND TRADEMARK OFFICE
CERTIFICATE OF CORRECTION

PATENT NO. : 5,331,898
DATED : July 26, 1994
INVENTOR(S) : Eric Villedieu et al.

It is certified that error appears in the above-identified patent and that said Letters Patent is hereby corrected as shown below:

Column 2, lines 12 and 13, delete "or in combination, it is possible to add to the".

Column 3, line 32, delete "comprises" and insert -- comprise--.

Column 4, line 8, delete "effect" and insert --affect--.

Column 8, line 5, after "fixed" insert --and--.

Column 10, line 39, (claim 14, line 3), delete "flat" (first occurrence);

lines 39 and 40, (claim 14, lines 3 and 4), delete "(71) or a flat projection";

line 41, (claim 14, line 5), delete "flat"; and lines 41 and 42, (claim 14, lines 5 and 6), delete "or notches".

Signed and Sealed this

Twenty-ninth Day of November, 1994

*Attest:*

BRUCE LEHMAN

*Attesting Officer*     *Commissioner of Patents and Trademarks*